United States Patent [19]

Gelderloos

[11] 4,327,437
[45] Apr. 27, 1982

[54] RECONFIGURING REDUNDANCY MANAGEMENT

[76] Inventor: Robert A. Frosch, Administrator of the National Aeronautics and Space Administration, with respect to an invention of Hendrik J. C. Gelderloos, Largo, Fla.

[21] Appl. No.: 173,518

[22] Filed: Jul. 30, 1980

[51] Int. Cl.³ .................... G06F 11/18; G05B 23/02
[52] U.S. Cl. .................................... 371/68; 244/194; 318/564
[58] Field of Search ................ 371/68, 36; 318/563, 318/564; 244/194, 195

[56] References Cited

U.S. PATENT DOCUMENTS

| | | | |
|---|---|---|---|
| 3,420,993 | 1/1969 | Chamberlain et al. | 371/68 |
| 3,667,057 | 5/1972 | Pfersch, Jr. et al. | 371/36 |
| 3,686,493 | 8/1972 | Schmid | 371/68 |
| 3,944,974 | 3/1976 | Buscher et al. | 371/68 |
| 3,979,720 | 9/1976 | Laas et al. | 371/68 |
| 4,101,958 | 7/1978 | Patterson et al. | 371/68 |
| 4,130,241 | 12/1978 | Meredith et al. | 371/68 |
| 4,143,353 | 3/1979 | Schaible | 371/36 |
| 4,276,648 | 6/1981 | Tomlinson | 371/68 |

*Primary Examiner*—Charles E. Atkinson
*Attorney, Agent, or Firm*—Carl O. McClenny; John R. Manning; Marvin F. Matthews

[57] ABSTRACT

Input signals from sensor (S) in a redundancy management system are provided redundantly in parallel so that a primary control signal may be selected. Median value signals for groups of three sensors are detected in median value selectors (30, 32, 34, 36, 40) of selection filters (F). The detected median value signals are then also compared in a subtractor/comparator (38) to determine whether any of them exceed the others by an amount greater than the signal level for a failed sensor. If so, the exceeding detected medium value signal is sent to a control computer (10) as the primary control signal. If not, the lowest level detected medium value signal is sent as the primary control signal.

18 Claims, 6 Drawing Figures

RECONFIGURING REDUNDANCY MANAGEMENT

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; U.S.C. 2457).

DESCRIPTION

1. Technical Field

The present invention relates to error detection and redundancy management of multiple sensors.

2. Background Art

In certain applications where reliability is critical, such as in advanced avionic systems, redundant components such as sensors, computers and actuators are used. Failures of such components are detected and the system is reconfigured to compensate for the detected failure. System reliability thus becomes a function of how successfully the redundant equipment can be managed. Examples of such systems are those of U.S. Pat. Nos. 3,895,223, 3,665,173 and 4,084,774.

In certain situations, sensor null failures occurred where a sensor would fail and produce a null or zero output plus or minus some specified tolerance level. Another type of sensor failure has been termed a hardover failure, where a sensor would fail and provide a full amplitude signal. For spacecraft in quiescent flight, it has been difficult to detect and identify sensor null failures, because nominal vehicle rates of close to zero degrees/second did not differ appreciably from a null failure sensor reading. Additionally, during long periods of quiescent flight two separate null failures could have occurred and gone undetected.

In U.S. Pat. No. 3,639,778, voting circuits were used which operated in accordance with a truth table to select the second most positive input signal in one-half of the possible input conditions and the second most negative input signal for the other one-half of the possible inputs. However, situations existed where this selection technique would select a failed sensor input signal as the proper input signal due to the input selection criteria.

Another technique has been to form some form of weighted average value of the various input signals for use as a comparison reference, such as in U.S. Pat. Nos. 3,667,057; 3,681,578 and 3,979,720. However in situations where actual sensed values are quite close in magnitude to the output of failed sensors, the desirability of weighted average comparison has been questioned.

DISCLOSURE OF INVENTION

Briefly, the present invention relates to the selection of a primary control signal for redundancy management in a system having a plurality of sensors providing input signals redundantly in parallel to at least one control computer to provide the computer with the primary control signal representing an output from a properly operating, rather than a failed, sensor. In the preferred embodiment, the sensors are in an aircraft or spacecraft avionics system and include accelerometers and gyroscopes for flight control of the craft. The present invention may be performed with analog circuitry, digital circuitry or in a properly programmed digital computer.

Input signals in groups of three from the sensors are received and compared so that the median value signal of the three input signals can be detected. As used in the present invention, median value signal is defined as being the one of the input signals which is greater than or equal to one of the other two input signals while also being less than or equal to the other input signal.

The detected median value signals are then compared to determine if any one of the detected median value signals exceeds the others by an amount greater than the signal level for a failed sensor. If this is the case, the detected median value signal which exceeds the others is transmitted to the control computer as the primary control signal. If it is not the case, the primary control signal transmitted to the control computer is the one of lowest amplitude.

With the present invention the system continually reconfigures the redundant sensor inputs so as to minimize failure effects on system performance. Dual null failures of two sensors or a hardover failure of one sensor can be tolerated with the present invention. Further, due to the continual reconfiguration occurring prior to any attempt at detection or identification of the nature of the sensor failure, redundancy management may be performed at a later time and at a slower rate, minimizing computation load on the control computer.

BEST MODE FOR CARRYING OUT THE INVENTION

Figure 1:
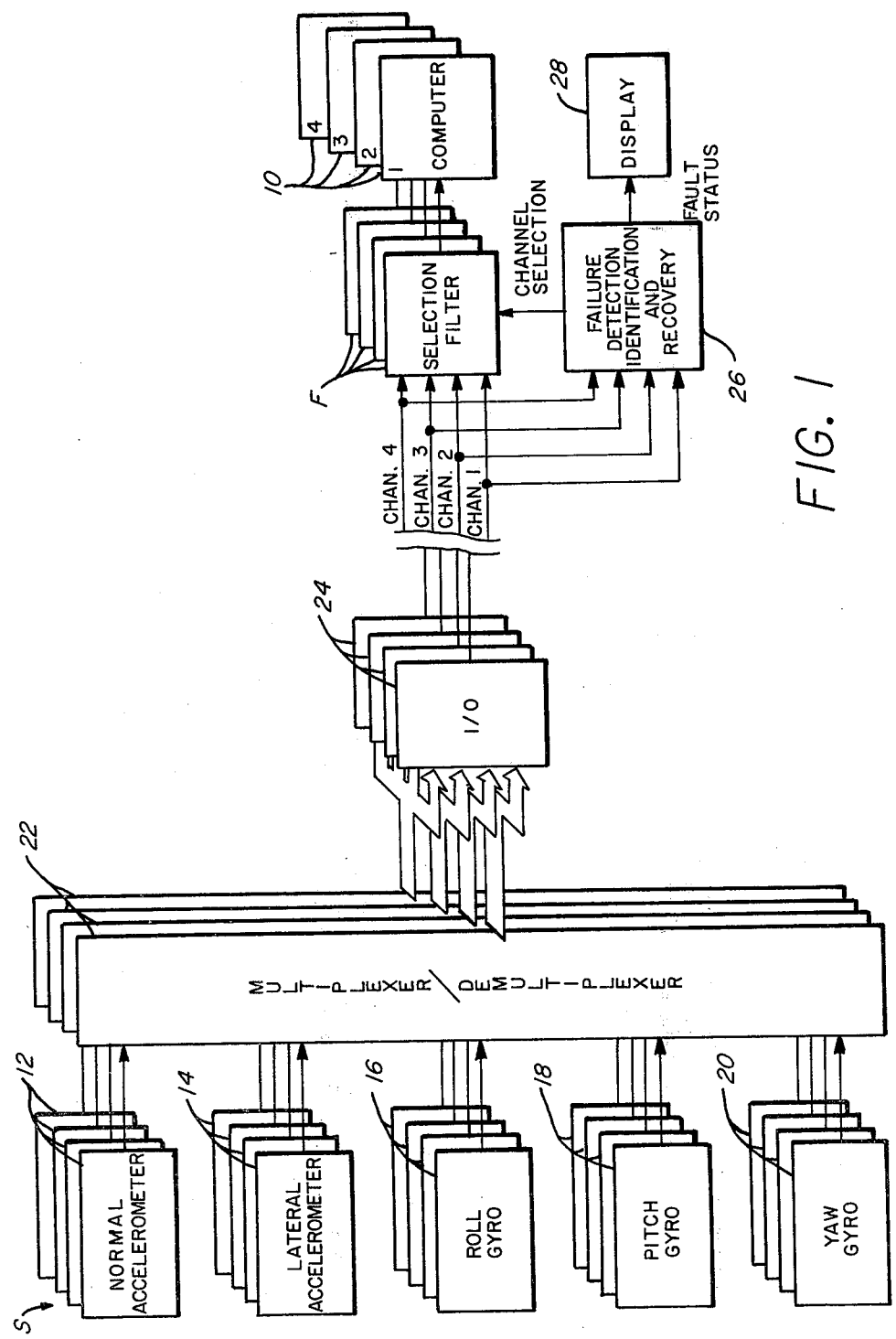
FIG. 1 is a schematic diagram of a redundancy management system incorporating the present system therein.

In the drawings, a redundancy management system is set forth having a plurality of sensors S providing input signals redundantly in parallel to at least one control computer 10 to provide the computer 10 with a primary control signal representing the output from a properly operating, rather than a failed, sensor S. In the preferred embodiment, the sensors are in an aircraft or spacecraft avionics system, although it should be understood that the present invention may also be used in other types of redundancy management systems, if desired. As is typical in redundancy management systems, a plurality of control computers 10 of like structure and function are provided to operate in a parallel arrangement.

In the preferred embodiment, the sensors S are arranged into a number of groups of like number to the number of control computers 10, with each sensor group including a normal accelerometer 12, a lateral accelerometer 14, a roll gyro 16, a pitch gyro 18 and a yaw gyro 20.

Each of the groups of sensors S is electrically connected to an individual multiplexer/demultiplexer 22 which sequentially samples the sensors S connected thereto to determine the readings of such sensors. Since the multiplexer/demultiplexer circuits 22 are of like structure and function, they bear like reference numerals in the drawings.

A plurality of input/output (I/O) data busses 24 of like structure and function are electrically connected to receive the readings from each group of sensors S from the plural multiplexer/demultiplexers 22 to provide the computer 10 associated therewith with data readings from each of the groups of sensors in the form of multiple parallel channels or data streams.

A selection filter F according to the present invention receives the channels from the input/output bus 24 associated therewith and, in a manner to be set forth below, provides the computer 10 with a primary control signal SS, or selected signal, representing an output from a properly operating, rather than a failed, sensor. The input/output busses 24 further provide the parallel channels of data from the sensor groups to a failure detection, identification and recovery operator 26, which may be any of several conventional types which detect failed sensors and provide fault status signals to a display status indicator 28. The failure detection operator 26 further provides channel selection signals to the selection filter F in the event that a failure is detected. The failure detection technique depends, of course, on the particular type of conventional failure detection operator 28 used and the number of failures detected and identified.

When all four channels are operating and no failures have been detected in the failure detection operator 26, the selection filter F of the present invention operates to group the channels or input signals from the input/output busses 24 into groups of three, comparing the groups of three signals to choose the median value signal of the three input signals. As used in the present invention, median value signal is defined as being the one of the input signals which is greater than or equal to one of the other two input signals while also being less than or equal to the other input signal.

In the selection filter F (FIG. 2), the detected median value signals are then compared to determine if any of the detected signals exceeds the others by an amount greater than the signal level for a failed signal. If this is the case, the detected median value signal which exceeds the others in such a manner is transmitted to the control computer 10 as the primary control signal. If no detected median value signal so exceeds the others, the primary control signal transmitted from the selection filter F to the control computer 10 is the one having the lowest amplitude.

For example, in accordance with the present invention, for three input signals, a, b, c, the following control laws apply for definition of median value signal MVS depending upon the relative amplitude of the signals:

| WHERE | $b \leq a \leq c$ OR $c \leq a \leq b$ | THEN MVS = a |
| WHERE | $a \leq b \leq c$ OR $c \leq b \leq a$ | THEN MVS = b |
| WHERE | $a \leq c \leq b$ OR $b \leq c \leq a$ | THEN MVS = c |

The selection filter F operates in accordance with these control laws to provide the control computer 10 with a proper primary control signal. The functions performed by the selection filter F may be implemented with a digital circuit, an analog circuit or may be performed in a properly programmed computer.

Figure 2:
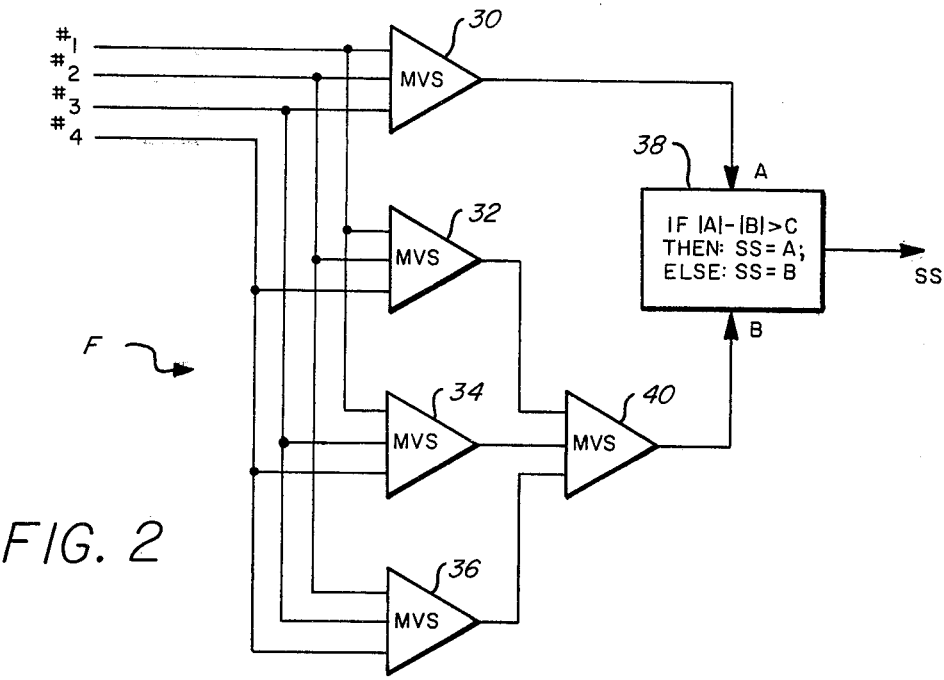
FIG. 2 is a schematic diagram of an apparatus according to the present invention.

The operation of the present invention can more readily be understood by reference to FIG. 2, which indicates the functions performed by the selection filter F, in whichever format. In the selection filter F, the channels of data from input/output bus 24 are provided in groups of three to four median value selector circuits or operators 30, 32, 34 and 36.

The median value selector value operator 30 forms a first selector section and receives input signals from channels 1, 2 and 3 and selects the median value signal therefrom, providing same as an input signal A to a subtractor/comparator 38. The median value selector operators 32, 34 and 36 form a first selector stage of a second selector section and receive input signals from the channels as indicated in FIG. 2, each selecting a median value signal from the three presented thereto and providing such median value signals as inputs to a median value selector operator 40 which forms a second selector stage of the second selector section. The median value selector 40 selects a median value signal from the three presented thereto from the median value selectors 32, 34 and 36 and provides the selected median value signal as an input signal B to the subtractor/comparator operator 38. Each of the median value selectors 30, 32, 34, 36 and 40 operate to indicate a median value signal from the three provided thereto in accordance with the controls laws defined above. Specific circuitry for performing this function and processing step will be set forth below.

In the subtractor/comparator operator 38, the absolute magnitude of the input signal B is subtracted from the absolute magnitude of the input signal A and the result obtained compared in a comparator with a reference level C, representing the maximum possible signal level output of a rate gyro which has failed to null. In the event that the absolute value of the input signal A to the subtractor/comparator 38 exceeds the absolute value of the input signal B by an amount greater than the reference level signal C, the subtractor/comparator operator 38 provides the signal A as the proper control signal SS to the flight control computer 10. In the event that the results of subtraction do not exceed the reference level C, the lower value input signal B is provided as the proper control signal SS to the computer 10.

From the foregoing, it can be seen that the functions performed in the subtractor/comparator operator 38 automatically selects a rate gyro output which exceeds the output of a rate gyro failed to null, and can continually reconfigure even where there are dual null failures. To illustrate, turning now to FIG. 3, the following charts represent output signals in the selection filter F at various times:

CHART I

| ALL FOUR CHANNELS OPERATING | |
|---|---|
| COMPONENT | OUTPUT (CHANNEL) |
| SELECTOR 30 | 2 |
| 32 | 2 |
| 34 | 3 |
| 36 | 3 |
| 40 | 3 |
| SUBTRACTOR/COMPARATOR 38 | 3 |

CHART II

| CHANNEL 3 FAILS NULL | |
|---|---|
| COMPONENT | OUTPUT (CHANNEL) |
| SELECTOR 30 | 1 |
| 32 | 2 |
| 34 | 1 |
| 36 | 2 |
| 40 | 2 |

CHART II-continued

| CHANNEL 3 FAILS NULL | |
|---|---|
| COMPONENT | OUTPUT (CHANNEL) |
| SUBTRACTOR/COMPARATOR 38 | 2 |

CHART III

| CHANNEL 2 NOW ALSO FAILS NULL | |
|---|---|
| COMPONENT | OUTPUT (CHANNEL) |
| SELECTOR 30 | NULL |
| 32 | 1 |
| 34 | 1 |
| 36 | NULL |
| 40 | 1 |
| SUBTRACTOR/COMPARATOR 38 | 1 |

Figures 3, 4:
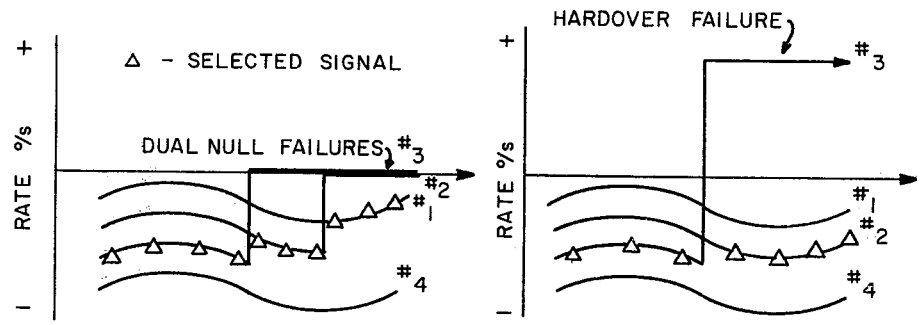
FIGS. 3 and 4 are waveform diagrams illustrating the operation of FIG. 2.
Figure 6:
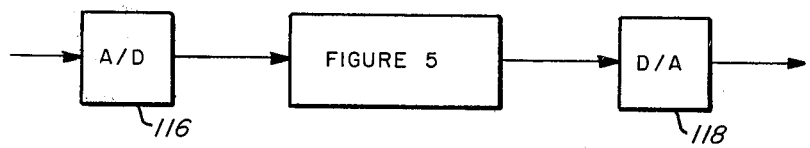
FIGS. 5 and 6 are schematic circuit diagrams of alternative circuitry which may be used in the apparatus of FIG. 2.

Referring now to FIG. 4, the following chart sets forth the operation of the selection filter F to detect the proper control signal in the event of a hardover failure to one of the sensors providing data in the input channel thereto. Prior to the hardover failure of channel 3 illustrated in FIG. 4, the output signals from the components of the selection filter F are as set forth in Chart I above.

CHART IV

| CHANNEL 3 FAILS HARDOVER | |
|---|---|
| COMPONENTS | OUTPUT (CHANNEL) |
| SELECTOR 30 | 1 |
| 32 | 2 |
| 34 | 1 |
| 36 | 2 |
| 40 | 2 |
| SUBTRACTOR/COMPARATOR 38 | 2 |

Thus, with the present invention, dual null failures or one hardover failure can be tolerated while still ensuring that the control computers 10 receive a proper control signal.

DIGITAL IMPLEMENTATION

Figure 5:
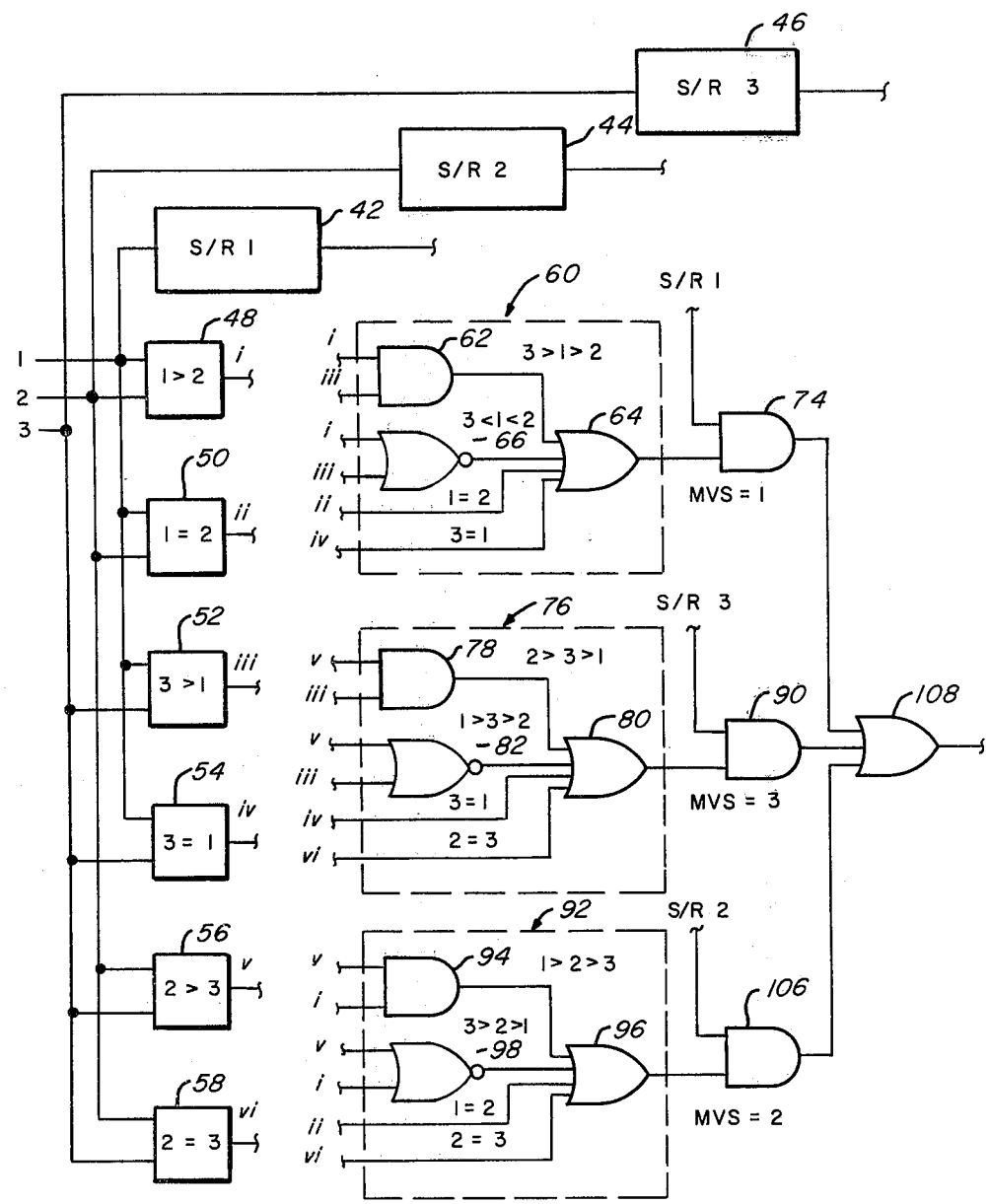

In FIG. 5, a digital implementation for the median value selector 30 operator in the selection filter F is set forth to implement and detect the median value signal presented thereto in accordance with the operating control laws set forth above. Other than the particular channel inputs provided thereto, selectors 32, 34 and 36 and 40 are of like function and operation. Suitable power supplies and timing and control signals are, of course, provided. The input signals are first furnished to a bank of comparators by the connection indicated. The three input signals are also furnished to separate storage registers 42, 44 and 46 and are stored therein. A comparator 48 forms a logic "1" if the data on channel 1 exceeds in magnitude the data on channel 2. Should the data value on channel 2 exceed the data value on channel 1, the comparator 48 forms a logic "0" output signal. A comparator 50 forms a logic "1" output signal only when the data value on channel 1 equals the data value on channel 2. Otherwise, the output of the comparator 50 is logic "0".

A comparator 52 forms a logic "1" output signal if the data value on channel 3 exceeds the magnitude of the data value of the data in channel 1. Should the data value on channel 1 exceed the data value on channel 3, the comparator 52 forms a logic "0" output signal. A comparator 54 forms a logic "1" output signal only when the data value of the data on both channels 1 and 3 are equal. Otherwise, the output of the comparator 54 is a logic "0". Similarly, a comparator 56 forms a logic "1" if the data on channel 2 exceeds the magnitude of the data value on channel 3. If the data value on channel 3, however, exceeds the data value on channel 2, the comparator 56 forms a logic "0" output signal. Finally, a comparator 58 forms a logic "1" signal only when the data value of the data on channels 2 and 3 are equal. Otherwise, the output of the comparator 58 is a logic "0" output.

The output signals from the foregoing comparators are furnished to various gating circuits shown in FIG. 5. In view of the number of such circuits and in order to preserve clarity in the drawings, the outputs from the comparators are assigned identifiers in accordance with the following chart:

| COMPARATOR OUTPUT | IDENTIFIER |
|---|---|
| 48 | i |
| 50 | ii |
| 52 | iii |
| 54 | iv |
| 56 | v |
| 58 | vi |

Other gates in FIG. 5 receiving these outputs as input signals are so designated by corresponding identifiers at their input terminals.

For example, the outputs from the comparators 48, 50, 52 and 54 are provided to a gating circuit 60 which includes AND gate 62 connected to the outputs of comparators 48 and 52 which forms a logic "1" output signal provided the conditions indicated at the output thereof are present with respect to the data magnitudes of channels 1, 2 and 3. The output from the AND gate 62 is provided as an input to an OR gate 64.

The OR gate 64 is further connected to a NOR gate 66 which receives the output signals from comparator 48 and 52 and provides a logic "1" output signal provided the conditions indicated at the output of gate 66 are fulfilled. The OR gate 64 also receives input signals from the comparators 50 and 54 and thus forms a logic "1" output signal in the event the condition detected by either of comparators 50 or 54 is fulfilled.

Analysis of the four input signals to the OR gate 64 indicate that the gating circuit 60 functions to select the signal on channel 1 as the median value signal in accordance with the control laws specified above, since the signal level of the signal on channel 1 either equals or exceeds the signal level on channel 2 and is less than or equal to the signal on channel 3, or conversely, equals or exceeds the signal level on channel 3 and is less than or equal to the signal level on channel 2. In such a situation, the OR gate 64 of the gating circuit 60 forms a logic "1" output signal which is furnished to an AND gate 74 permitting the data contents of shift register 42 containing the data value of the signals on channel 1 to pass therethrough as the median value signal.

The outputs from the comparators 52, 54, 56, and 58 are provided to a gating circuit 76 which includes AND gate 78 connected to the outputs of comparators 56 and 52 which forms a logic "1" output signal provided the conditions indicated at the output thereof are present with respect to the data magnitudes of channels 1, 2 and 3. The output from the AND gate 78 is provided as an input to an OR gate 80. The OR gate 80 is further connected to a NOR gate 82 which receives the output signals from comparator 52 and 56 and provides a logic "1" output signal provided the conditions indicated at the output of gate 82 are fulfilled. The OR gate 80 also receives input signals from the comparators 54 and 58 and thus forms a logic "1" output signal in the event the condition detected by either of comparators 54 or 58 is fulfilled.

Analysis of the four input signals to the OR gate 80 indicates that the gating circuit 76 functions to select the signal on channel 3 as the median value signal in accordance with the control laws specified above, since the signal level of the signal on channel 3 either equals or exceeds the signal level on channel 2 and is less than or equal to the signal on channel 1, or conversely, equals or exceeds the signal level on channel 1 and is less than or equal to the signal level on channel 2. In such a situation, the OR gate 80 of the gating circuit 76 forms a logic "1" output signal which is furnished to an AND gate 90 permitting the data contents of shift register 46 containing the data value of the signals on channel 3 to pass therethrough as the median value signal.

The outputs from the comparators 48, 50, 56, and 58 are provided to a gating circuit 92 which includes AND gate 94 connected to the outputs of comparators 48 and 56 which forms a logic "1" output signal provided the conditions indicated at the output thereof are present with respect to the data magnitudes of channels 1, 2 and 3. The output from the AND gate 94 is provided as an input to an OR gate 96. The OR gate 96 is further connected to a NOR gate 98 which receives the output signals from comparator 48 and 56 and provides a logic "1" output signal provided the conditions indicated at the output of gate 98 are fulfilled. The OR gate 96 also receives input signals from the comparators 50 and 58 and thus forms a logic "1" output signal in the event the conditions detected by either of comparators 50 or 58 is fulfilled.

Analysis of the four input signals to the OR gate 96 indicate that the gating circuit 92 functions to select the signal on channel 2 as the median value signal in accordance with the control laws specified above, since the signal level of the signal on channel 2 either equals or exceeds the signal level on channel 1 and is less than or equal to the signal on channel 3; or conversely, equals or exceeds the signal level on channel 3 and is less than or equal to the signal level on channel 1. In such a situation, the OR gate 96 of the gating circuit 92 forms a logic "1" output signal which is furnished to an AND gate 106 permitting the data contents of shift register 44 containing the data value of the signals on channel 2 to pass therethrough as the median value signals.

Finally, the single output stage of the MVS selector is a triple input OR gate 108 receiving outputs from AND gates 74, 90 and 106.

As has been set forth above, each of the remaining median value selectors 32, 34 and 36 and 40 are of like construction and function, with the exception of the different input channels provided thereto.

The selector 30 selects the median value signal from channels 1, 2 and 3 and provides such signal as the input signal A to the absolute value subtractor/comparator 38. Further, the selectors 32, 34 and 36 in the first selector stage of the second selector station each operate in a like manner to the selector set forth in FIG. 5 and select the median value signal from the three input signals provided thereto, furnishing such median value signals to the second selector stage 40 which forms an output signal B representing the median value signal of the three median value signals selected in the first selector group of the second selector stage. Further, the selector 40 provides the output signal B as as input to the subtractor/comparator 38 which functions in the manner described above.

It is evident to those skilled in the art that the new and improved operating sequence of steps above performed in the digital implementation operating in accordance with the control laws set forth above could equally as well be performed in a properly programmed general purpose digital computer which would perform comparisons to determine median value signals between two groups of the input signals, determine median value signals from each section, subtract the absolute value of the median value signals in each section and compare the subtraction results to a predetermined reference level stored in memory to select a primary control signal for provision to the control computer 10.

ANALOG IMPLEMENTATION

In the event that the present invention is to be performed on analog signals, input analog data would first be provided to an analog-to-digital (A/D) converter 116 which would convert the input data from each of the four channels into digital data which would be furnished as input signals to the digital selector F described above in FIGS. 2 and 5 and the proper control signal would then be furnished as an input signal to a digital-to-analog (D/A) converter 118 where it would be again converted into an analog value representing the proper control signal. Of course, analog comparators and gating circuits operating according to the principles of the control laws and in the manner of the median value selector digital circuit of FIG. 5 could as well be used.

OPERATION OF INVENTION

In the operation of the present invention, input data from the groups of sensors S are collected in the multiplexer slot/demultiplexer circuits 22 and provided in parallel, redundant groups through the input/output busses 24 to each of the control computers 10 through the selection filters F associated therewith. The selection filters F group the input signals into groups of three and compare the input signal so that the median value signal of the three input signals can be detected. The detected median value signals from the median value selector operators are then compared in the subtractor/comparator operator 38 to determine if any of the detected median value signals exceeds the others by an amount greater than the signal level for a failed sensor. If this is the case, the excessive detected median value signal is provided as the control signal to the control computer 10. If the converse is the case, the lowest amplitude detected median value signal is provided as the proper control signal to the control computer 10.

Since the comparison level in the comparator 38 represents the maximum possible output of a rate gyro sensor which has failed to null, with the present invention, any rate gyro output level which exceeds such a maximum possible output is logically selected. Thus, even in the event of dual null failures during quiescent operation, the selection filter F of the present invention continually reconfigures around dual null failures, instantly switching to the proper control signal at the time of the first null failure (FIG. 3) and then again at the time of the second null failure (FIG. 3). It is to be noted that with the present invention, reconfiguration by the selection filter F to the proper control signal occurs prior to detection and identification of the nature of the failure by the failure detection operator 26. Thus, with the present invention, null failed or hardover failed sensors are disregarded in redundancy management until such time as sensor reading rates increase. At this time, the redundancy management techniques will be more able to distinguish null output from proper sensor outputs and detect rate gyro null failures. Further, with the present invention, the redundancy management techniques of the present invention permit fast reconfiguration with minimal processing time required of the control computer 10 and with minimal requirements on the memory resources of the control computer 10, allowing redundancy management implementation to later detect failures at a slower processing rate.

The foregoing disclosure and description of the invention are illustrative and explanatory thereof, and various changes in the size, shape, materials, components, circuit elements, wiring connections and contacts, as well as in the details of the illustrated circuitry and construction may be made without departing from the spirit of the invention.

We claim:

1. An apparatus for selecting a primary control signal for redundancy management in a system having a plurality of sensors providing input signals in parallel to a control computer to provide the computer with a primary control signal representing an output from a properly operating sensor, comprising:
   (a) selector means for receiving and comparing input signals in groups of three from the sensors and detecting the median value signal of the three input signals;
   (b) comparator means for comparing the detected median value signals to detemine if any one of the detected median value signals exceeds the others by an amount greater than the signal level for a failed sensor;
   (c) said comparator means further including means for transmitting to the control computer as the primary control signal a detector median value signal which exceeds the others by an amount greater than the signal level for a failed sensor and means for transmitting to the control computer as the primary control signal the least of the detected median value signals when no detected median value so exceeds the others.

2. The apparatus of claim 1, wherein said comparator means comprises:
   comparator means for comparing the detected median value signals to determine if any one of the detected median value signals exceeds the others by an amount greater than the signal level for a null failed sensor.

3. The apparatus of claim 1, wherein said comparator means comprises:
   (a) means for forming a difference signal representing the difference between absolute values of the detected median value signals; and
   (b) means for comparing the difference signal with the signal level for a failed sensor.

4. The apparatus of claim 1, wherein the sensors are sensors in an avionic system.

5. The apparatus of claim 4, wherein the sensors include accelerometers.

6. The apparatus of claim 4, wherein the sensors include gyroscopes.

7. The apparatus of claim 1, wherein said selector means comprises:
   (a) a first selector section for receiving three input signals for detecting the median value signal of such input signals;
   (b) a second selection section having:
      (1) an initial selector stage having at least three selectors, each for detecting the median value signal of such input signals furnished thereto; and
      (2) a further selector stage having as inputs the median value signals from said initial selector stage for detecting the median value signal of such input signals.

8. The apparatus of claim 7, wherein said comparator means comprises:
   means for comparing the detected median value signals from said first selection section and said second selection section to determine if any one of the detected median value signals exceeds the others by an amount greater than the signal level for a failed sensor.

9. An apparatus for selecting a primary control signal for redundancy management in a system having a plurality of groups of sensors, each sensor group providing input signals in parallel to a plurality of control computer to provide the computers with primary control signals representing outputs from properly operating sensors, comprising:
   (a) selector means for receiving and comparing input signals in groups of three from the sensors and detecting the median value signal of the three input signals;
   (b) comparator means for comparing the detected median value signals to detemine if any one of the detected median value signals exceeds the others by an amount greater than the signal level for a failed sensor;
   (c) said comparator means further including means for transmitting to the control computer as the primary control signal a detected median value signal which exceeds the others by an amount greater than the signal level for a failed sensor and means for transmitting to the control computer as the primary control signal the least of the detected median value signals when no detected median value so exceeds the others.

10. A method of selecting a primary control signal for redundancy management in a system having a plurality of sensors providing input signals in parallel to a control computer to provide the computer with a primary control signal representing an output from a properly operating sensor, comprising the steps of:
    (a) receiving and comparing input signals in groups of three from the sensors and detecting the median value signal of the three input signals;
    (b) comparing the detected median value signals to determine if any one of the detected median value signals exceeds the others by an amount greater than the signal level for a failed sensor;
    (c) transmitting to the control computer as the primary control signal as a detector median value signal which exceeds the others by an amount greater than the signal level for a failed sensor; and
    (d) transmitting to the control computer as the primary control signal the least of the detected median value signals when no detected median value so exceeds the others.

11. The method of claim 10, wherein said step of comparing comprises:

comparing the detected median value signals to determine if any one of the detected median value signals exceeds the others by an amount greater than the signal level for a null failed sensor.

12. The method of claim 10, wherein said step of comparing comprises:
  (a) forming a difference signal representing the difference between absolute values of the detected median value signals; and
  (b) comparing the difference signal with the signal level for a failed sensor.

13. The method of claim 10, wherein the sensors are sensors in an avionic system.

14. The method of claim 13, wherein the sensors include accelerometers.

15. The method of claim 13, wherein the sensors include gyroscopes.

16. The method of claim 10, wherein said step of receiving and comparing input signals comprises:
  (a) dividing the received signals into two groups; and
  (b) comparing the input signals of the two groups to determine a detected median value signal in each of the two groups.

17. The method of claim 16, wherein said step of comparing the detected median value signals comprises:
  comparing the detected median value signals from the first group and the second group to determine if any one of the detected median value signals exceeds the others by an amount greater than the signal level for a failed sensor.

18. A method of selecting a primary control signal for redundancy management in a system having a plurality of groups of sensors, each sensor group providing input signals in parallel to a plurality of control computers to provide the computers with primary control signals representing outputs from properly operating sensors, comprising the steps of:
  (a) receiving and comparing input signals in groups of three from the sensors and detecting the median value signal of the three input signals;
  (b) comparing the detected median value signals to determine if any one of the detected median value signals exceeds the others by an amount greater than the signal level for a failed sensor;
  (c) transmitting to the control computer as the primary control signal a detector median value signal which exceeds the others by an amount greater than the signal level for a failed sensor; and
  (d) transmitting to the control computer as the primary control signal the least of the detected median value signals when no detected median value so exceeds the others.

* * * * *